Feb. 21, 1967 HIROKI YOSHINE 3,305,780

PARALLEL-SERIAL-PARALLEL REGENERATIVE REPEATER FOR PCM SYSTEM

Filed April 30, 1963 2 Sheets-Sheet 1

Feb. 21, 1967 HIROKI YOSHINE 3,305,780

PARALLEL-SERIAL-PARALLEL REGENERATIVE REPEATER FOR PCM SYSTEM

Filed April 30, 1963

2 Sheets-Sheet 2

United States Patent Office 3,305,780

Patented Feb. 21, 1967

3,305,780

PARALLEL-SERIAL-PARALLEL REGENERATIVE REPEATER FOR PCM SYSTEM

Hiroki Yoshine, Shinagawa-ku, Tokyo-to, Japan, assignor to Kabushiki Kaisha Hitachi Seisakusho, Tokyo-to, Japan Filed Apr. 30, 1963, Ser. No. 276,961

Claims priority, application Japan, May 4, 1962, 37/17,581

2 Claims. (Cl. 325—38)

This invention relates to pulse-code-modulation communication systems. It is well known that such communication systems are of the most highly refined type having highly desirable features such as the almost complete absence of cross-talk and noise at the time of repeating and very high stability. The present invention, more particularly, relates to a new regenerative repeater of pulses modulated by pulse code modulation (hereinafter abbreviated to "code pulses") which are successively distributed and transmitted, for each bit, into a plurality of transmission lines in such a pulse-code modulation communication system.

In general, conventional code-pulse regenerative repeating systems have been based on the concept of wave reshaping of code pulses in the transmission lines and retiming thereof. This is the same as reproducing, by means of respective regenerative repeaters, the code pulses, in their original states, which are sent out at the transmitting terminal station into the transmission lines. That is, the transmission lines between the input and output of the above said regenerative repeater correspond to a one-to-one relationship. This is exactly the same also in regenerative repeaters in the case when code pulses are distributed and transmitted to a plurality of transmission lines. Accordingly, in the above-stated conventional system, the repetition frequency of the pulses transmitted through the distribution lines is the same as that of the original code pulses. For this reason, the transmission loss is substantially high, and, in the case when the repeating interval is to be changed, a severe restriction is imposed. This is explained in "An Experimental Pulse Code Modulation System," by C. G. Davis, B.S.T.J., January 1962 (Bell Telephone Laboratories).

On the other hand, in the code-pulse regenerative repeating system according to the present invention, which differs completely from the above-mentioned conventional system, the number of transmission lines between the input and output of the regenerative repeater is varied, and code pulses are thus successively distributed and transmitted, whereby it is contemplated to completely eliminate the aforedescribed disadvantages of conventional systems.

Between the transmitting end and receiving end repeaters are arranged at proper space distances. By said repeaters, code-pulses are discriminated and regenerated, and the input-line and output-line of these repeaters are respectively one line.

In such case, the repetition frequency capable of producing the code-pulses to be transmitted is in inverse proportion to the space distance of the repeaters, as shown in the FIG. 2 of the sketch.

Because the transmission loss of the transmission line increases in proportion of the transmission frequency, for the sake of the ratio of pulses to noises necessary for discrimination and regeneration of the code-pulses of the repeaters invariable, it is necessary to compensate for the increase of the transmission loss of the cable caused by the increase of the transmission freqency by shortening the length of the cable (transmission line).

Therefore, the high repetition frequency of the code-pulses results in a decrease of a repeating distance rather than when said repetition frequency is lower.

Consequently, when it is desired to extend the repeating distance without varying the repetition frequency of code-pulses of the output of the coder (for example, when it is impossible to equip a repeater station because of geographical or other circumstances), it becomes necessary to reduce the transmission loss of the transmission line. As the means for attaining said purpose, there are the following ways:

(1) To use a transmission line having a small transmission loss.

(2) To lower the repetition frequency of the transmission line. (The repetition frequency of the output of the coder is constant).

The concrete means in respect of (2) above is the system wherein a plurality of transmission lines is used, and FIG. 3 in the sketch shows a simple case of this system.

When the repetition frequency of code pulses in the transmitting station is $f_0$ and these code pulses are distributed to a plurality ($n$ lines) of transmitting lines from the initial single transmitting line by the repeater, the repetition frequency of code-pulses in each of the transmitting lines becomes $$\frac{f_0}{n}$$

whereby the repeating distance can be extended considerably.

With the instant invention, it becomes possible to vary freely the number of input and output lines of the repeater, so that a distance between both repeaters can be optionally designed, which has various effects, e.g., that the plan for circuits can be freely made without accepting any influence of the geographical circumstances, such as mountains, rivers and oceans, or artificial obstacles; the capacity of transmission lines can be utilized to a maximum; and the transmission lines already present can be utilized.

The nature, principle, and details of the invention will be best understood by reference to the following description, taken in conjunction with the accompanying drawing in which.

Figures 1, 2:
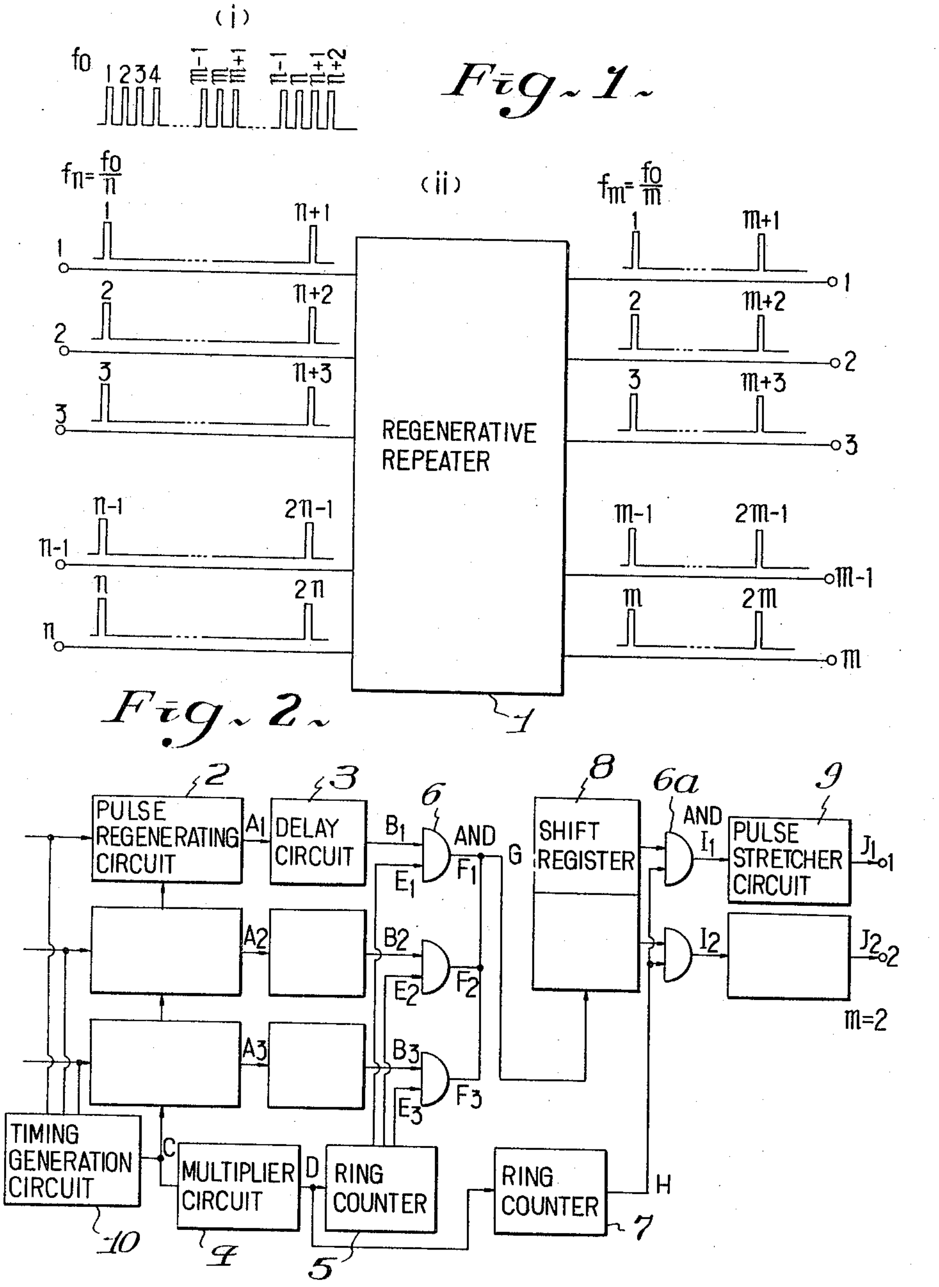
FIGURE 1 is a schematic diagram of a preferred embodiment of the invention, the said diagram being in a form for indicating the principle of the regenerative repeating system according to the invention.
FIGURE 2 is a block diagram showing a specific example of the regenerative repeater shown in FIGURE 1.

Referring to FIGURE 1, the present invention provides a regenerative repeating system wherein pulses which have been transmitted by distributing original code pulses among $n$ transmission lines for each bit slot as indicated in FIGURE 1 (*i*) are redistributed among $m$ transmission lines and transmitted by a regenerative repeater 1 as indicated in FIGURE 1 (*ii*). Consequently, in this case, the repetition frequency $fn$ of the code pulses on the input side is $1/n$ of the repetition frequency $fo$ of the original code pulses, and the repetition frequency $fm$ of the output code pulses of the regenerative repeater 1 is $1/m$ of that of the original code pulses and $n/m$ times the repetition frequency $fn$ of the input side code pulses. That is, $$f_m = \frac{fo}{m} = f_n \frac{n}{m}$$

A specific example of the aforesaid regenerative repeater 1 is shown in FIGURE 2. The operational characteristics of the system embodying the invention in the case when the said regenerative repeater 1 is provided with three input transmission lines ($n=3$) and two output transmission lines ($m=2$) are indicated by the time chart of FIGURE 3. For the sake of simplifying the description, the following is presented with respect to the case of $n=3$ and $m=2$.

Figure 3:
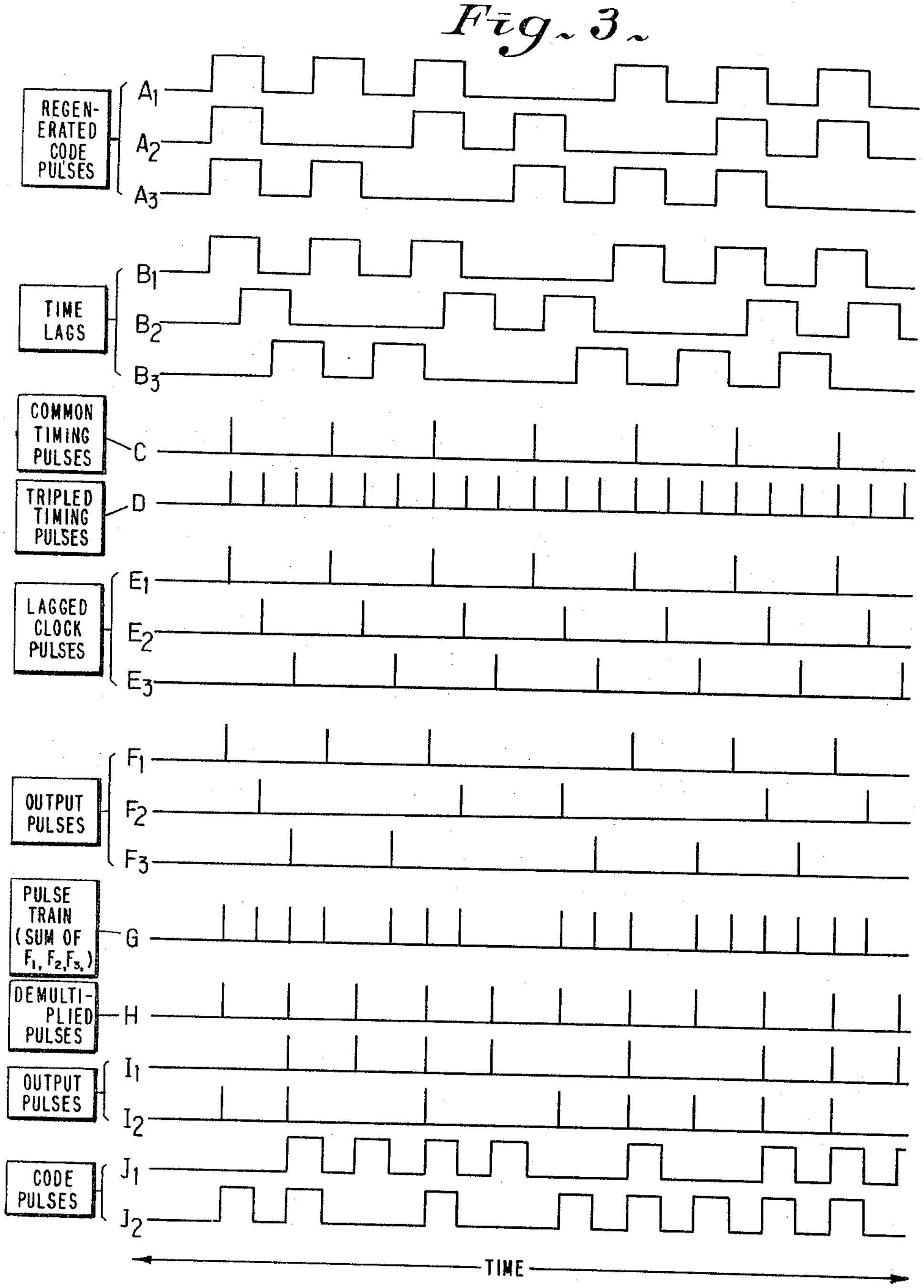
FIGURE 3 is a time chart indicating the operational characteristics of the embodiment shown in FIGURES 2 and 3 for one specific case thereof.

First, the code pulses as indicated in FIGURE 1 which have been transmitted through the transmission lines and have arrived are regenerated in the respective pulse regenerating circuits 2 provided in the said transmission lines by common timing pulses (FIGURE 3, C) which are created in a timing generation circuit 10 from the said code pulses, the said code pulses being thereby regenerated into the forms indicated in FIGURE 3, $A_1$, $A_2$, and $A_3$. These regenerated pulses $A_1$, $A_2$, and $A_3$ are further delayed, by respective delay circuits 3, successively by time lags which are whole-number multiples of the time corresponding to ⅓ of the pulse recurrence interval as indicated by FIGURE 3, $B_1$, $B_2$, and $B_3$.

The aforesaid common timing pulses C are tripled ($n=3$) in a multiplier circuit 4, as indicated by D in FIGURE 3, and enter a ring counter 5 of three stages ($n=3$) to cause the generation of clock pulses which are successively lagged by ⅓ phase such as $E_1$, $E_2$, and $E_3$. Respective "AND" circuits 6 are provided to obtain the logical products of the said clock pulses $E_1$, $E_2$, and $E_3$ and the aforesaid output pulses $B_1$, $B_2$, and $B_3$ of the delay circuits 3, and output pulses as indicated by $F_1$, $F_2$, and $F_3$ are obtained from the said "AND" circuits 6. Then, from the said output pulses, a pulse train of the sum of the aforesaid pulses $F_1$, $F_2$ and $F_3$, as indicated by G, is obtained. Next, the said pulses G are applied to a shift register 8 of two stages ($m=2$). Then, the aforesaid tripled timing pulses D are introduced into a ring counter 7 of two stages ($m=2$), and pulses H demultiplied to ½ are obtained. "AND" circuits **6*a* are activated by the said demultiplied pulses H to read out the contents of the aforesaid shift register 8, and output pulses $I_1$ and $I_2$ are obtained. Then, the said pulses $I_1$ and $I_2$ are applied to pulse stretcher circuits 9** and formed into code pulses $J_1$ and $J_2$ of a pulse width which is convenient for transmission, the said code pulses $J_1$ and $J_2$ then being transmitted. Thus, the input code pulses are completely distributed and transmitted successively through the output transmission lines, wherefore the contemplated results are attained.

As described above, the present invention provides a regenerative repeating system wherein the required number of transmission lines between the input and output of a regenerative repeater is varied, and the repetition frequency of the pulses in the distribution lines is caused to be the product of the repetition frequency of the original code pulses and a fraction consisting of a numerator of unity and a denominator equal to the number of distribution lines. Accordingly, by the use of the regenerative repeating system according to the invention, it is possible to reduce transmission losses in the transmission lines and to vary at will the repeating intervals. That is, when it is desired to effect a great change in the section from a certain repeating point to the succeeding repeating point, or to change transmission lines, such changes can be readily and easily accomplished, in the practice of the present invention, by changing at will the number of distribution lines at the repeating points. The manner of synchronization of the system is set forth by Davis (loc. cit.).

Although this invention has been described with respect to a particular embodiment thereof, it is not to be so limited as changes and modifications can be made therein which are within the full intended scope of the invention as defined by the appended claims.

What is claimed is:

1. A regenerative repeating system for pulse-code-modulation distribution-transmission communication comprising means for regenerating code-modulated signals transmitted simultaneously through at least one input-transmission line for each bit slot; means for rearranging the signals thus regenerated into a serial pulse train; and means for distributing the pulses of said pulse train to output transmission lines; the relation between the number $n$ of the input transmission lines, the repetition frequency $f_n$ of the input transmission signals, the number $m$ of the output transmission lines and repetition frequency $f_m$ of the output transmission signals being $$(f_n \times n = f_m \times m)$$

2. A regenerative repeater for pulse code modulation distribution-transmission communication comprising means for receiving arriving pulse-code-modulation signals transmitted through at least one input transmission line for each bit slot and for regenerating said signals; means for delaying the pulses thus regenerated; means for rearranging said delayed signals into a serial pulse train by gating with a first set of timing pulses obtained from said arriving signals; and means for distributing the pulses from said train to output transmission lines by a second set of timing pulses, also derived from said arriving signals; the relationship between the number $n$ of the input transmission lines, the repetition frequency $f_n$ of the input transmission signals, the number $m$ of the output transmission lines and the repetition frequency $f_m$ of the output transmission signals being represented by $$f_n \times n = f_m \times m$$

References Cited by the Examiner

UNITED STATES PATENTS

| | | | |
|---|---|---|---|
| 2,603,714 | 7/1952 | Meacham | 179—15 |
| Re. 25,546 | 3/1964 | Saal et al. | 179—15 |

OTHER REFERENCES

Carbrey, "Video Transmission Over Telephone Cable Pairs by Pulse Code Modulation," Proceedings of the IRE, vol. 48, No. 9, September 1960, pp. 1546–1561.

DAVID G. REDINBAUGH, *Primary Examiner.*

J. T. STRATMAN, *Assistant Examiner.*